Feb. 13, 1951 J. C. COOLEY 2,541,462
MOBILE CONVEYER
Filed July 27, 1945 2 Sheets-Sheet 1
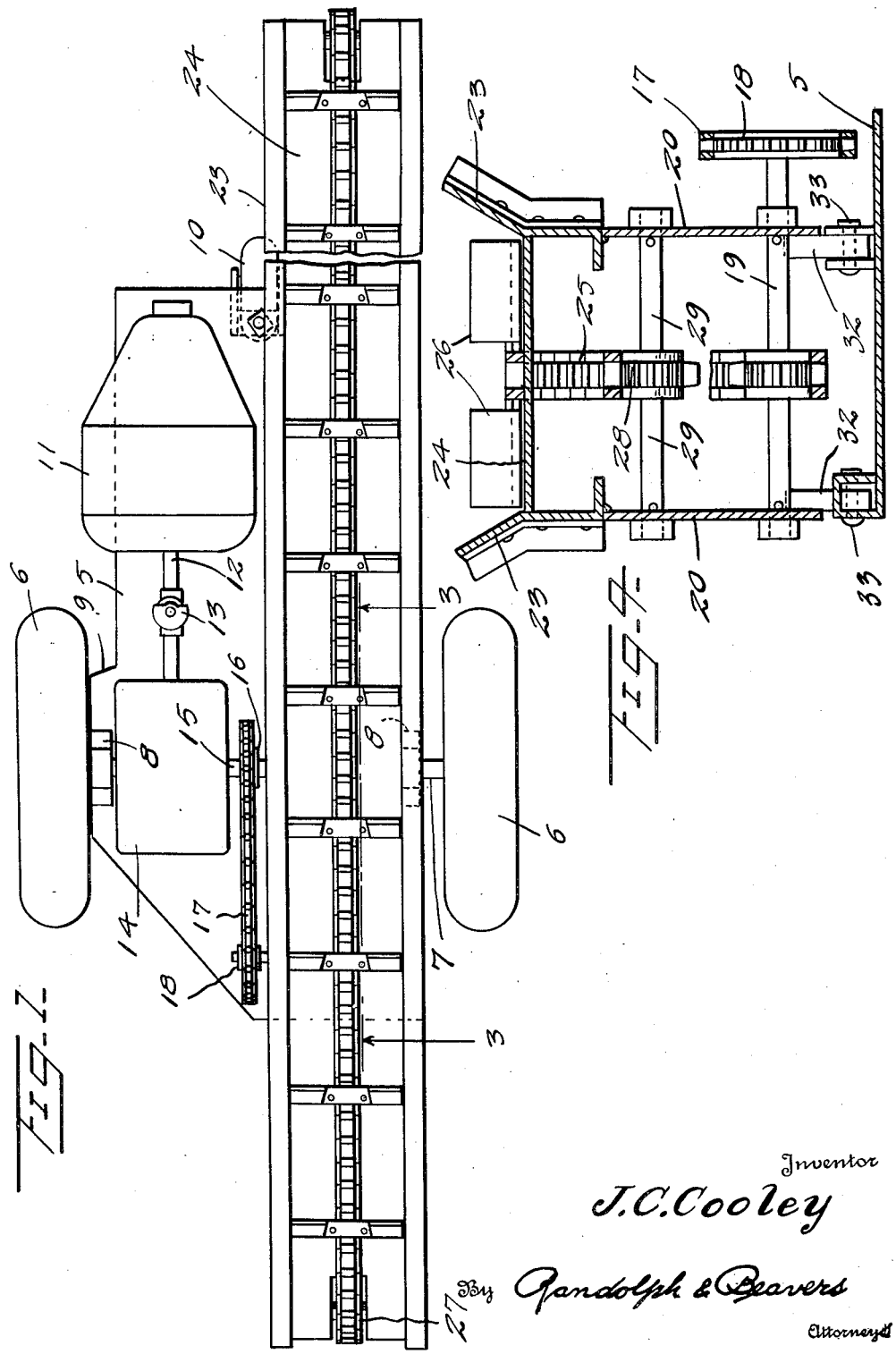
Inventor
J. C. Cooley
By Randolph & Beavers
Attorneys Feb. 13, 1951  J. C. COOLEY  2,541,462
MOBILE CONVEYER
Filed July 27, 1945  2 Sheets-Sheet 2
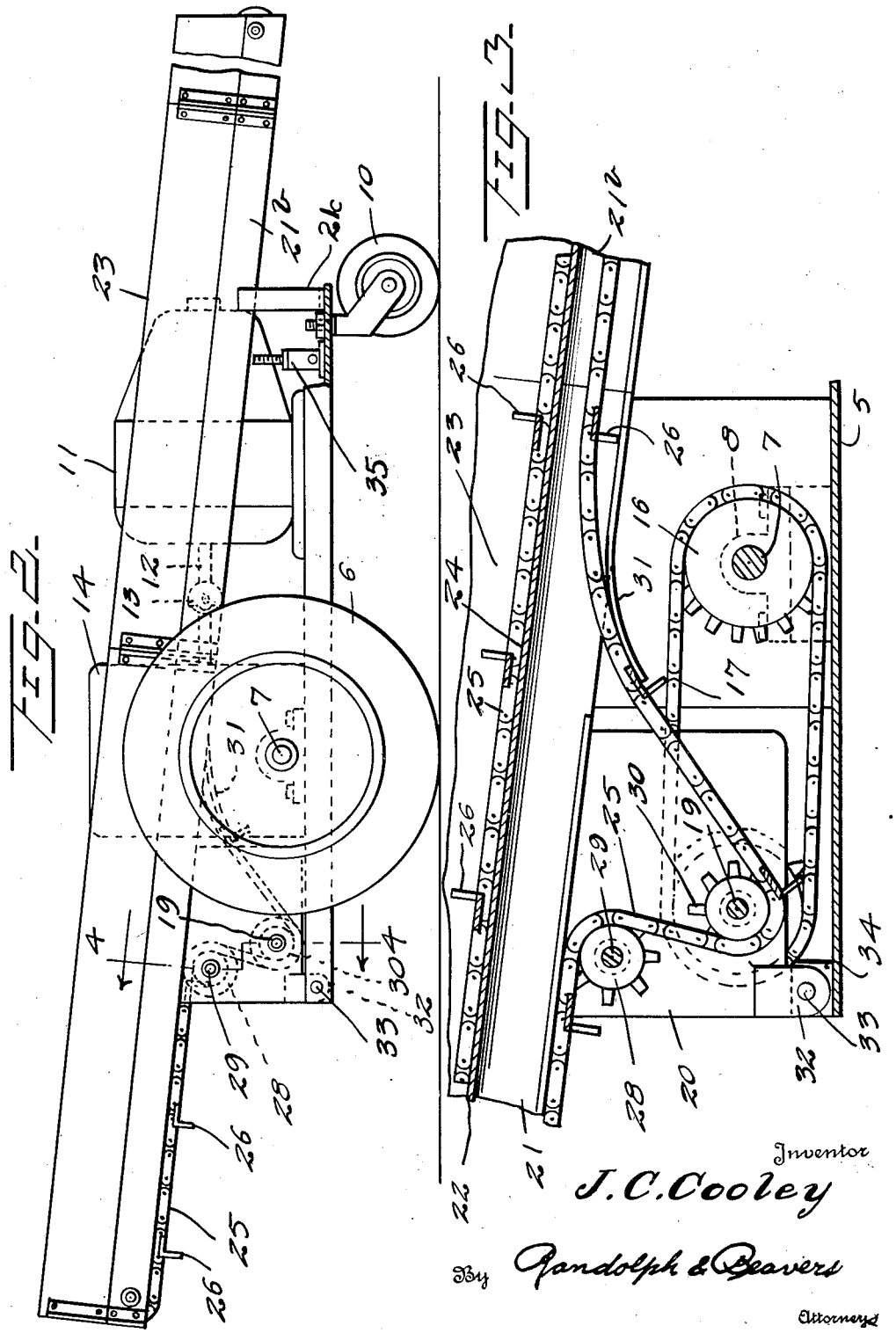

Patented Feb. 13, 1951

2,541,462

UNITED STATES PATENT OFFICE 2,541,462

MOBILE CONVEYER

Jake C. Cooley, Drift, Ky.

Application July 27, 1945, Serial No. 607,412

1 Claim. (Cl. 198—233)

This invention relates to improvements in drive head assemblies of coal mine conveyors of the chain and pan type.

The principal object of this invention is to provide a mobile drive head having an under conveyor drive and which is capable of being easily moved manually from point to point as requirements demand.

Another important object of the invention is to provide a drive head assembly of the character stated which has its chain drive located beneath the conveyor and inwardly of the receiving end thereof for the purpose of eliminating this bulk which at present, in some instances is in the way of miners.

Other objects and advantages of the invention will become apparent to the reader of the following description.

In the drawings:

Figure 1 is a top plan view of the machine.

Figure 2 is a side elevational view.

Figure 3 is a fragmentary enlarged detailed sectional view taken on line 3—3 of Figure 1.

Figure 4 is an enlarged transverse fragmentary sectional view taken on line 4—4 of Figure 2.

Referring to the drawings wherein like numerals designate like parts, it can be seen that numeral 5 denotes a platform supported by wheels 6, 6 located on an axle 7 which is journaled through bearings 8 located on a substantially wide part 9 of the platform 5.

The wheels 6 and axle 7 are located toward one end of the platform 5, while the opposite end of the platform is supported by swiveled caster wheel 10.

Suitably mounted on the platform 5 is an electric motor 11 or other power plant having a drive shaft 12 extending therefrom and perhaps interrupted by a universal connection 13.

This drive shaft extends to a speed reducing unit located within a housing 14 and is geared to a shaft 15 which extends from the housing 14 and is equipped with a sprocket wheel 16, over which a sprocket chain 17 is trained. This sprocket chain 17 extends over a second sprocket wheel 18 located on a shaft 19, which is journaled through bearings on side walls 20, which depend from a pan structure 21 forming part of a conveyor assembly generally referred to by numeral 22. The platform has a rest 21c for the conveyor assembly 22.

The conveyor assembly 22 has a trough 23 and this trough in turn has a bottom 24 along which a conveyor chain 25 moves, this chain being provided with pusher members or cleats 26, which ride along the bottom 24, insofar as the top flight of the chain 25 is concerned.

The chain passes over a sprocket wheel 27 at the adjacent end of the pan structure and continues over this end portion of the head assembly to a sprocket wheel 28, which is located on a shaft 29 (see Figure 2). From there the lower flight of the conveyor chain 25 extends downwardly and under a sprocket wheel 30 located on the driven shaft 19, and from there the chain extends upwardly and over a guide lip 31 to the guide tunnel 21v, underlying the bottom 24 of the trough (see Figure 3). The trough 23, bottom 24 and guideway 21v are normally referred to as the pan structure.

The sidewalls 20 depending from the pan structure are provided with ears 32 pivotally connected as at 33 to upstanding lugs 34 on the platform.

In the operation of this machine, it can be observed that the drive means, being located under and inwardly of one end of the conveyor, does not interfere with the loading of the conveyor or the action of miners adjacent the machine. Furthermore, the conveyor can be readily tilted to any desired position through the medium of a jack 35 or some other suitable lift means.

The power plant 11 furnishes power to the conveyor chain 25, not the wheels of the assembly head, it being preferable that this head assembly be constructed of light materials so that they can be readily pushed about and steered to any desired position through the medium of the caster wheel 10.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

In a mobile conveyor, a platform, a pair of vertical walls, each pivotally secured at one of its lower corners to one end of the platform, an elongated conveyor including an endless chain, said conveyor being secured to the upper portions of said vertical walls, a rest for the conveyor at the opposite end of the platform, a jack on the platform adjacent the rest and engageable with the conveyor for elevating the overlying portion of the conveyor above the rest, a pair of vertically spaced horizontal shafts carried by and between said vertical walls, each shaft carrying a sprocket over which the lower flight of said conveyor is trained, the lower shaft being a power shaft.

JAKE C. COOLEY.

(References on following page)

REFERENCES CITED

The following references are of record in the file of this patent:

UNITED STATES PATENTS

| Number | Name | Date |
|---|---|---|
| 810,739 | Fieback | Jan. 23, 1906 |
| 981,052 | Bohling | Jan. 10, 1911 |
| 1,460,172 | Nelson | June 26, 1923 |
| 1,856,677 | Whitnall | May 3, 1932 |
| 1,882,096 | Shaw | Oct. 11, 1932 |
| 1,917,134 | Levin | July 4, 1933 |
| 2,140,636 | Levin | Dec. 20, 1938 |
| 2,343,133 | Blank | Feb. 29, 1944 |
| 2,343,444 | Coon | Mar. 7, 1944 |